July 19, 1927.
C. G. STRUBLER ET AL
1,636,257
INDICATOR ACTUATING AND CONTROLLING DEVICE FOR SCALES
Filed Sept. 17, 1925
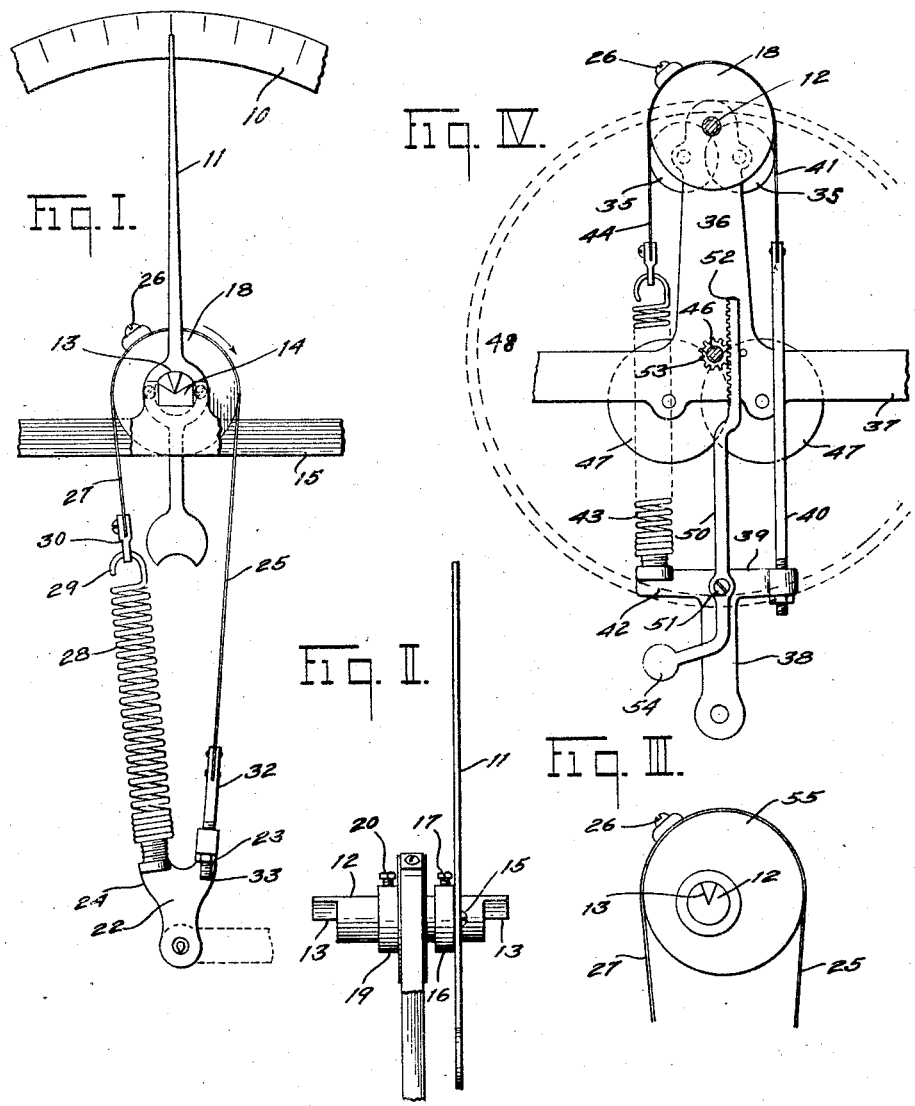
Inventor
Charles G. Strubler
Gordon L. Strubler
By
Marshall
Attorney Patented July 19, 1927.

1,636,257

UNITED STATES PATENT OFFICE.

CHARLES G. STRUBLER AND GORDON L. STRUBLER, OF CHICAGO, ILLINOIS, ASSIGNORS TO TOLEDO SCALE COMPANY, OF TOLEDO, OHIO, A CORPORATION OF NEW JERSEY.

INDICATOR ACTUATING AND CONTROLLING DEVICE FOR SCALES.

Application filed September 17, 1925. Serial No. 56,814.

This invention relates to improvements in scales, and refers more particularly to a novel indicator actuating and controlling device, which indicator may be either a hand operating over a fixed dial or a drum operating in connection with a fixed indicating pointer. The invention consists in the combination and arrangement of the parts shown in the drawings and described in the specification and is pointed out in the appended claims.

Among the objects of the invention is to simplify scale indicator actuating devices, to render the same positive in the weighing action of the scale and to also avoid likelihood of derangement of the adjustment of the scale under varying conditions of use.

A further object of the invention is to provide a scale indicator actuating device in which the lever arms of the rocking member, which is connected to and actuates the indicator and is acted upon by the load transmitting and the counterbalancing means, remain unchanged regardless of a change of angle of the said means relatively to the rocking member.

A further object of the invention is to provide a novel scale indicator actuating device having a counterbalancing and indicator return helical spring which is unattached to a stationary part of the scale and is therefore a floating spring, thereby rendering the scale less sensitive to temperature conditions such as tend to unbalance the scale.

We have shown in the drawings two forms of our improvements adapted to two different types of scales, but it will be understood that the essential principles of the invention may be adapted to widely different types of scales, and that the invention is not limited to the details illustrated except as said details are hereinafter made the subject of specific claims.

In said drawings:—

Figure I is a diagrammatic view of our improvements adapted to a fan type of scale wherein the indicator hand has a comparatively small range of movement;

Figure II is a view of the parts shown in Figure I in a plane at a right angle to that of said Figure I;

Figure III is a detail of a modified form of rocking indicator actuating member;

Figure IV is a diagrammatic illustration of another form of scale to which our improvements may be applied.

First referring to the construction shown in Figures I and II, 10 designates a portion of the graduated scale or dial and 11 the swinging indicator hand which sweeps the same. Said dial and lever may be those of a simple weighing scale, or may indicate the elements of a computing scale, so far as is concerned the adaptation of my invention thereto.

The indicating hand 11 is fixed to a pivot shaft 12 provided with the usual knife edges 13, 13, which are supported on V-shaped bearings 14 on appropriate fixed parts 15 of the scale structure. Said indicator hand 11 is shown as fixed to the shaft by means of a screw 15 that extends through the indicator hand and into a collar 16 that is mounted on the pivot shaft 12, and is locked thereto by a set screw 17. 18 designates a rocking member that is also fixed to said shaft. Said rocking member, as herein shown, has the form of a disc and is provided at one side with a hub 19 through which extends a locking set screw 20 that impinges against the shaft to lock the rocking member to the shaft.

22 designates what is herein termed as a load transmitting member. It may be formed to constitute in itself a support for the load, as when the scale is a hanging scale, or may be connected in any suitable manner to a scale beam. The load transmitting member 22 may therefore be varied in its details to adapt it to different types of scales as will be apparent.

The load transmitting member 22 shown in Figure I is provided with two arms, 23, 24, respectively. The arm 23 is connected by a flexible band or other element 25 with the rocking member 18, said band being trained over a portion of the periphery of the rocking member and attached thereto, as by means of a screw 26. The said band may be continued on the other side of the rocking member beyond the screw 26 downwardly towards the load transmitting member 22 to constitute a flexible element 27 which is attached to the upper end of a helical spring 28, the lower end of said spring being in turn attached to the arm 24 of the load transmitting member. As herein shown the arm 24 is screw threaded to receive the lower helices or turns of the helical spring, whereby the latter is attached thereto. The spring is provided at its upper end with a hook 29 and the flexible band or tape 27 is provided with an apertured fitting 30 which is engaged by said hook.

As shown in Figure I, it may be assumed that the parts are in the position which they occupy when a load, representing about one half of the capacity of the scale, is supported on the load transmitting member 22 so as to bring the indicator hand to its mid position. When no load is supported on the scale the indicator hand occupies its zero position at one end of the dial 10 and the spring 28 is therefore more nearly closed than as shown in Figure I.

When the weight is applied to the load transmitting member 22 it acts equally on the inextensible band 25 and the spring 28, and by reason of the elasticity of the spring, the resultant action of the load on the loop connection, comprising the parts 25, 27 and 28, is to swing the indicator hand to the right. By reason of the fact that the spring member 28 of said actuating mechanism is unattached to any fixed part of the scale structure, the said spring is extended in both directions from a central or neutral point that is located between the ends of the spring. Therefore, the total extension of the spring is twice the movement of the load transmitting member 22. By reason of the fact that said spring is unattached to a fixed, and therefore relatively massive part of the scale, there is less tendency to derangement of adjustment of the scale due to temperature conditions, inasmuch as the only effect on the indicator actuating mechanism due to temperature changes is that inherent in the loop actuating device comprising the elements, 25, 27 and 28.

When the indicator hand is attached to the pivot shaft through the medium of the collar 16, said indicator hand may be adjusted relatively to the dial to bring the indicator at the zero position when the scale is balanced through the medium of the set screw 17. If desired, however, and in order to render this adjustment more convenient, the non-extensible member 25 may embrace a rod 32 which is attached in any suitable manner to the flexible tape or band 25 and is screw threaded at its lower end and extends through an opening in the arm 23 and is adjustably fixed thereto as by means of a nut 33.

In the event that the load transmitting member 22 is connected to a scale beam that is disposed in a plane at right angles to the plane of the axis of the pivot shaft 12, we may arrange the periphery of the rocking member 34 eccentric to its axis of rotation as shown in Figure III, so as to compensate for the change of angle on the load transmitting member 22 relatively to said shaft, due to the arc of movement of the swinging end of the scale beam.

An advantage of the construction shown, wherein the counterpoise spring 28 is attached at its ends to the movable parts of the indicator actuating mechanism, is that the displacement of the load transmitting member 22 to one side of the vertical, due to the arc of movement of the swinging end of a scale beam, and the consequent change of angle of the loop connections between the scale beam and the rocking member 18, comprising the parts 25, 27 and 28, do not change the lever arms acting on the rocking member 18 to turn and counterbalance the same, inasmuch as the lap of the flexible bands 25 and 27 on the periphery of said rocking member remains the same regardless of the general angle at which the actuating device is disposed with respect to the plane of the axis of the pivot shaft 12. Therefore the indicating hand does not tend to lag as it moves from its zero point towards the maximum point indicated on the dial or scale 10.

In Figure IV we have shown our improvements applied to a type of scale in which the indicator, whether it be a drum or indicating hand, has a wider range of sweep or movement than in the structure shown in Figure I; there being interposed between the rocking member and the indicator element of the scale a speed multiplying device.

As shown in said Figure IV, the rocking member 18 has a journal shaft which is mounted on rollers 35, 35, instead of the knife edge bearing shown in Figure I, said rollers being suitably supported on an upstanding member 36 that rises from a fixed part 37 of the scale structure. 38 designates the load transmitting member, one arm 39 of which is connected through the medium of a rod 40 with a flexible band 41. The other arm 42 of the load transmitting member is connected to the lower end of a helical spring 43, the upper end of which is connected to an inextensible flexible band 44 which may constitute a continuation of the band 41 or may be made a part separate therefrom, said band or bands being fixed to the rocking member 18 by the screw 26.

In the construction shown in Figure IV the indicator member is directly carried by a shaft 46 which is mounted below the rocking member 18 and is shown as supported on anti-friction rollers 47 mounted in any suitable manner on the frame member 37. As herein shown, the said shaft 46 bears a drum 48, indicated in dotted lines in Figure IV. The said drum bearing shaft is actuated through the medium of a rack bar 50 which is pivoted at 51 to the load transmitting member and is provided at its upper end with rack teeth 52 which mesh with the teeth of a pinion 53 that is fixed to the drum carrying shaft 46. A weight 54 carried by the lower end of said rack bar 50 holds the rack teeth in mesh with the pinion.

The operation of this construction is essentially the same as the construction shown in Figures I and II, with the exception that the load is transmitted to the member which directly carries the indicator through the medium of the rack and pinion mechanism shown instead of through the counterbalancing means shown in Figures I and II. In so far, however, as the counterbalancing and indicator returning mechanism is concerned, the operation of the device shown in Figure IV is essentially the same as that shown in Figures I and II.

As before stated, the structural details of our improved indicator actuating mechanism may be varied to adapt the same to different types of scales, and it is the intent to claim all of inherent novelty shown in the drawings and described in the specification.

We claim as our invention:—

1. An indicator actuating and controlling mechanism for scales comprising, in combination with an indicator, a load transmitting member and connections between the load transmitting member and the indicator embracing a flexible band and a floating helical spring, the latter to be placed under stress by the weight of the load and to return the indicator to zero when the scale is without load.

2. An indicator actuating and controlling mechanism for scales comprising, in combination with an indicator, a load transmitting member and connections between the load transmitting member and the indicator embracing a floating counterbalancing spring and a flexible band.

3. An indicator actuating and controlling device for scales comprising, in combination with an indicator, a load transmitting member, a rocking member connected to the indicator and connections between the load transmitting member and rocking member, embracing a spring having a neutral axis between its ends and extensible in both directions from said axis and connected at one end to the load transmitting member and flexibly connected at it other end to said rocking member.

4. An indicator actuating and controlling device for scales comprising, in combination with an indicator, a load transmitting member, a rocking member connected to the indicator and a flexible loop, the ends of which are connected to said load transmitting member and the mid-portion of which is trained over the rocking member, one member of said loop including a floating helical spring.

5. An indicator actuating and controlling device for scales comprising, in combination with an indicator, a rocking member connected to the indicator, a load transmitting member and connections between the load transmitting and rocking member comprising a band connected at one end to the load transmitting member and at its other end to the rocking member, and a helical spring connected at one end to the rocking member and at its other end to said load transmitting member.

6. An indicator actuating and controlling device for scales comprising, in combination with an indicator, a rocking member connected to the indicator, a load transmitting member and a connection between the load transmitting and rocking members comprising a band connected at one end to the load transmitting member and at its other end to the rocking member, a spring connected at one end to the rocking member and at its other end to said load transmitting member, and adjusting take up mechanism included in said connection.

7. An indicator actuating and controlling device for scales comprising, in combination with an indicator, a load transmitting member, a rocking member connected to the indicator and a flexible loop, the ends of which are connected to said load transmitting member and the mid-portion of which is trained over the rocking member, said loop including a spring member and the connections between the rocking member and indicator.

8. In a scale, in combination, a load transmitting member, a rocking member, a flexible loop connected to the load transmitting member, and trained over the rocking member, and a counterpoising spring connected to said flexible loop and load transmitting member.

9. In a scale indicator actuating device a rocking element, a floating spring adapted for connection to a load supporting member by means permitting variation of the calibrating function of the spring and connected also through said rocking member to said load supporting member by a flexible band.

10. In a scale, a supporting frame, bearings mounted in said frame, a rocking member mounted on said bearings, an indicator, a flexible band adapted for connection to a load supporting member and to said rocking member and a helical counterbalancing spring operatively connected between said rocking member and said load supporting member.

11. In a scale, a rocking member, a floating counterbalancing spring, a flexible band, means for connecting said band and rocking member, and means for connecting said spring and band with the load member.

CHARLES G. STRUBLER.
GORDON L. STRUBLER.